(12) United States Patent
Hooton

(10) Patent No.: US 9,503,694 B2
(45) Date of Patent: Nov. 22, 2016

(54) METHODS AND APPARATUS FOR UTILIZING VEHICLE SYSTEM INTEGRATED REMOTE WIRELESS IMAGE CAPTURE

(71) Applicant: GM GLOBAL TECHNOLOGY OPERATIONS LLC, Detroit, MI (US)

(72) Inventor: Joel S. Hooton, Chesterfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 452 days.

(21) Appl. No.: 14/050,827

(22) Filed: Oct. 10, 2013

(65) Prior Publication Data

US 2015/0049184 A1    Feb. 19, 2015

Related U.S. Application Data

(63) Continuation-in-part of application No. 13/965,363, filed on Aug. 13, 2013.

(51) Int. Cl.
*H04N 7/18* (2006.01)

(52) U.S. Cl.
CPC ............... *H04N 7/181* (2013.01); *H04N 7/18* (2013.01)

(58) Field of Classification Search
CPC ...................................................... H04N 7/181
USPC ........................................................ 348/148
See application file for complete search history.

(56) References Cited

U.S. PATENT DOCUMENTS

| | | | | |
|---|---|---|---|---|
| 2009/0189981 A1* | 7/2009 | Siann | ...................... | H04N 7/183 348/143 |
| 2014/0340510 A1* | 11/2014 | Ihlenburg | ................. | H04N 7/18 348/118 |
| 2015/0002674 A1* | 1/2015 | Kleve | .................... | H04N 7/183 348/149 |
| 2015/0078283 A1* | 3/2015 | Nakamura, Jr. | ...... | H04W 12/06 370/329 |

FOREIGN PATENT DOCUMENTS

| | | |
|---|---|---|
| DE | 20110339 U1 | 10/2002 |
| DE | 102005027638 A1 | 11/2006 |
| DE | 102010005427 A1 | 9/2010 |
| DE | 102010039440 A1 | 2/2012 |

* cited by examiner

*Primary Examiner* — Yulin Sun
(74) *Attorney, Agent, or Firm* — Lorenz & Kopf, LLP

(57) ABSTRACT

A method for using an integrated wireless image capture system on a vehicle and a tow object is provided. The method connects to an image capture device over a vehicle-based wireless network, wherein the image capture device is positioned on the tow object; configures operational parameters for the image capture device; and receives, at a computer system onboard the vehicle, image data from the image capture device, wherein the image data is captured by the image capture device in accordance with the configured operational parameters.

20 Claims, 8 Drawing Sheets

METHODS AND APPARATUS FOR UTILIZING VEHICLE SYSTEM INTEGRATED REMOTE WIRELESS IMAGE CAPTURE

TECHNICAL FIELD

Embodiments of the subject matter described herein relate generally to vehicle wireless communications, and more particularly, embodiments of the subject matter relate to remote image capture as integrated into a vehicle wireless communications system.

BACKGROUND

Many vehicles today include onboard camera systems that provide an occupant of a vehicle a more detailed view of the areas outside the vehicle. Such areas outside of the vehicle may be difficult or impossible for the occupant to see from his normal seated position (usually, the driver seat). One such onboard camera system might employ a back-up camera, allowing a driver of the vehicle to view an area behind the vehicle that is much larger in scope than the area that can be seen by the driver through the rear window of the vehicle. Generally, these onboard camera systems are limited to a single, non-configurable, wired camera that is built into the vehicle hardware. This type of camera is commonly a back-up camera, providing only a view of the area directly behind a vehicle.

Accordingly, it is desirable to configure and use multiple wireless cameras onboard a vehicle, and to view their output on an in-vehicle display. Furthermore, other desirable features and characteristics will become apparent from the subsequent detailed description and the appended claims, taken in conjunction with the accompanying drawings and the foregoing technical field and background.

BRIEF SUMMARY OF EMBODIMENTS

Some embodiments provide a method for using an integrated wireless image capture system on a vehicle. The method connects to an image capture device over a vehicle-based wireless network; configures operational parameters for the image capture device; and receives image data from the image capture device, wherein the image data is captured by the image capture device in accordance with the configured operational parameters.

Some embodiments provide an onboard wireless communication system for a vehicle. The system includes a wireless camera configured to capture images and to transmit the images via a wireless network; and an automotive head unit (AHU) communicatively coupled to the camera, the AHU configured to receive and display the images from the wireless camera.

Some embodiments provide an AHU comprising a non-transitory, computer-readable medium containing executable instructions thereon. The executable instructions, when executed by a processor, are configured to receive input at the AHU, via a user interface, the input comprising: a first command to activate a camera; a second command for the camera to operate according to one or more specific parameters; and a third command for manipulating camera data received by the AHU. The executable instructions are further configured to transmit the first and second commands to the camera via a wireless network; receive the camera data transmitted by the camera, wherein the camera data is obtained by the camera operating according to the first and second commands; and manipulate the camera data according to the third command.

Some embodiments provide a method for using an integrated wireless image capture system on a vehicle and a tow object. The method connects to an image capture device over a vehicle-based wireless network, wherein the image capture device is positioned on the tow object; configures operational parameters for the image capture device; and receives, at a computer system onboard the vehicle, image data from the image capture device, wherein the image data is captured by the image capture device in accordance with the configured operational parameters.

Some embodiments provide a wireless communication system for a vehicle and a tow object coupled to the vehicle. The system includes a wireless camera, positioned on the tow object and configured to capture images and to transmit the images via a wireless network; and an automotive head unit (AHU) onboard the vehicle and communicatively coupled to the wireless camera, the AHU configured to receive the images from the wireless camera and to display the received images.

Some embodiments provide an automobile head unit (AHU) comprising a non-transitory, computer-readable medium containing executable instructions thereon, which, when executed by a processor, are configured to: receive input at the AHU, via a user interface, the input comprising: a first command to activate a camera positioned on a trailer, wherein the trailer is coupled to an automobile, and wherein the automobile houses the AHU; a second command for the camera to operate according to one or more specific parameters; and a third command for manipulating camera data received by the AHU. The executable instructions are further configured to transmit the first and second commands to the camera via a wireless network; receive the camera data transmitted by the camera, wherein the camera data is obtained by the camera operating according to the first and second commands; and manipulate the camera data according to the third command.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods used to communicate with one or more aftermarket cameras having wireless connectivity capabilities, via a vehicle onboard computer system. In certain embodiments, an interactive display may be used to configure the operation of one or more cameras that reside within a wireless range of the vehicle, and to view the output of the cameras according to user-specified parameters. In some embodiments, images from at least one camera are stored to system memory and/or uploaded to a website using an in-vehicle infotainment system.

Figure 1:
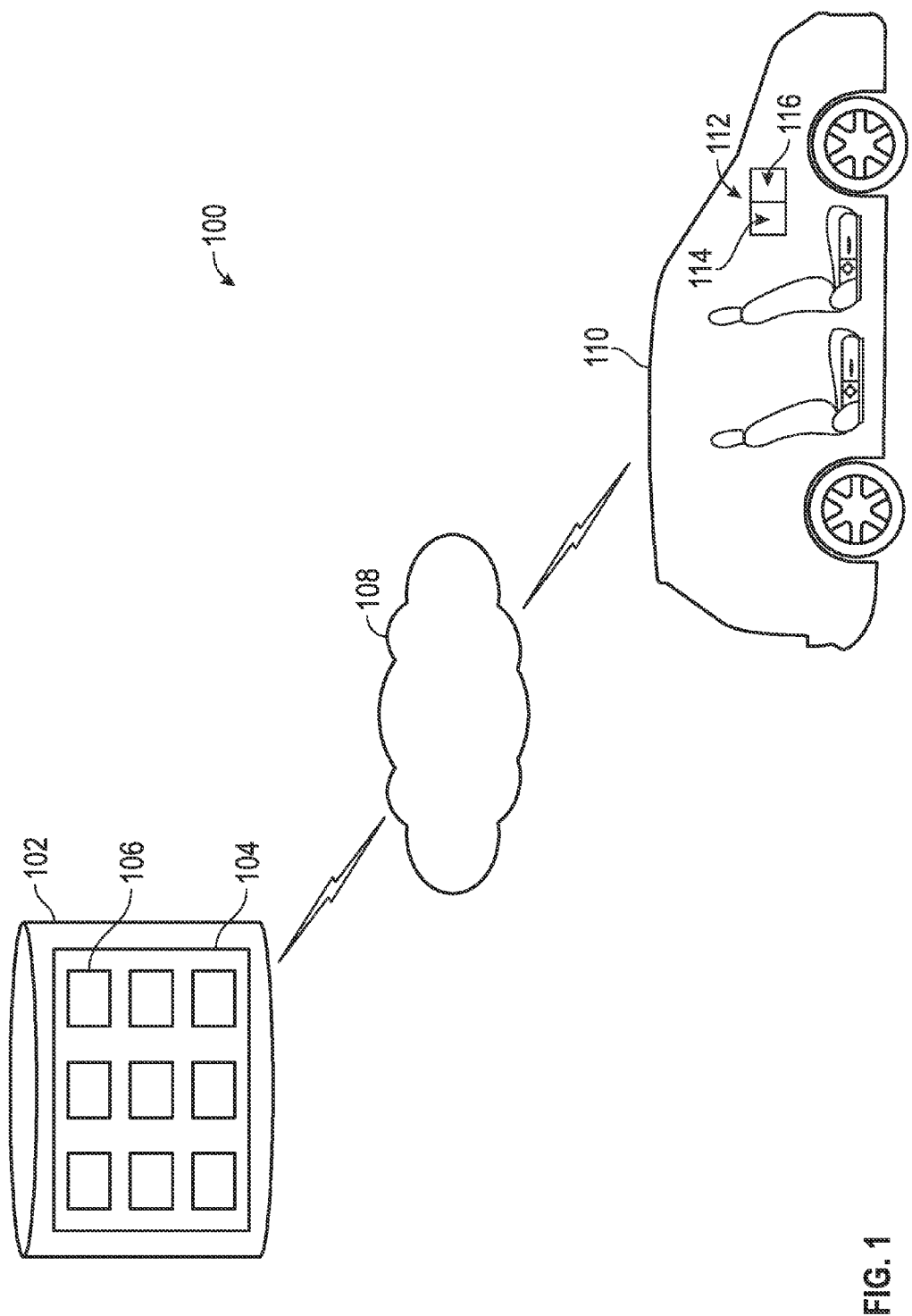
FIG. 1 is a diagram of a system for downloading software applications from a software application ecosystem to a vehicle, in accordance with the disclosed embodiments.

Referring now to the drawings, FIG. 1 is a diagram of a system 100 for downloading software applications from a software application ecosystem 104 to a vehicle 110, in accordance with the disclosed embodiments. As shown, a vehicle 110 has an onboard computer system 112, which receives information, data, and/or software from a downloadable software application ecosystem 104 via a data communication network 108.

In certain embodiments, the software application ecosystem 104 includes a collection of downloadable software applications, also called "apps" 106, which reside on at least one remotely located server 102. Each app 106 may contain executable code providing specific functionality for any number of tasks or information requests within a vehicle 110, and are compatible with an onboard computer system 112 of a vehicle.

The software application ecosystem 104 communicates with a vehicle 110 using a data communication network 108. In practice, the data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon Transmission Control Protocol/Internet Protocol (TCP/IP) or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The vehicle 110 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The vehicle 110 includes an onboard computer system 112. In certain embodiments, the onboard computer system 112 may be further divided into an automotive head unit (AHU) 114 and a network access device (NAD) 116. In practice, the AHU 114 and the NAD 116 could be implemented as two physically distinct components that are coupled via a communication link, or they could be integrated or otherwise combined into a single component. The NAD 116 and the AHU 114 can be communicatively coupled over any type of communication link including, but not limited to a wired communication link such as a USB connection, or a wireless communication link such as a Bluetooth communication link or WLAN communication link, etc. In one embodiment, the NAD 116 can be a communication device that is embedded/integrated within the vehicle 110 (i.e., a built-in carrier), and in another embodiment, the NAD 116 can be a consumer electronics device (such as a portable wireless communication device or smartphone) that is located in, or in communication range of, the AHU 114 (i.e., a brought-in carrier).

The AHU 114 includes various infotainment system components that are not illustrated in FIG. 1 for sake of clarity, such as one or more ports (e.g., USB ports), one or more Bluetooth interface(s), input/output devices, one or more display(s), one or more audio system(s), one or more radio systems, and a navigation system. In one embodiment, the input/output devices, display(s), and audio system(s) collectively provide a human machine interface (HMI) inside the vehicle.

The NAD 116 may include at least one communication interface, and in many cases, a plurality of communication interfaces. The NAD 116 allows the vehicle 110 to communicate information, including audio data, over-the-air using one or more wireless communication links. The physical layer used to implement these wireless communication links can be implemented using any known or later-developed wireless communication or radio technology. In some embodiments, the wireless communication links can be implemented, for example, using one or more of Dedicated Short-Range Communications (DSRC) technologies, cellular radio technology, satellite-based technology, wireless local area networking (WLAN) or WI-FI® technologies such as those specified in the IEEE 802.x standards (e.g.

IEEE 802.11 or IEEE 802.16), WIMAX®, BLUETOOTH®, near field communications (NFC), the like, or improvements thereof.

Figure 2:
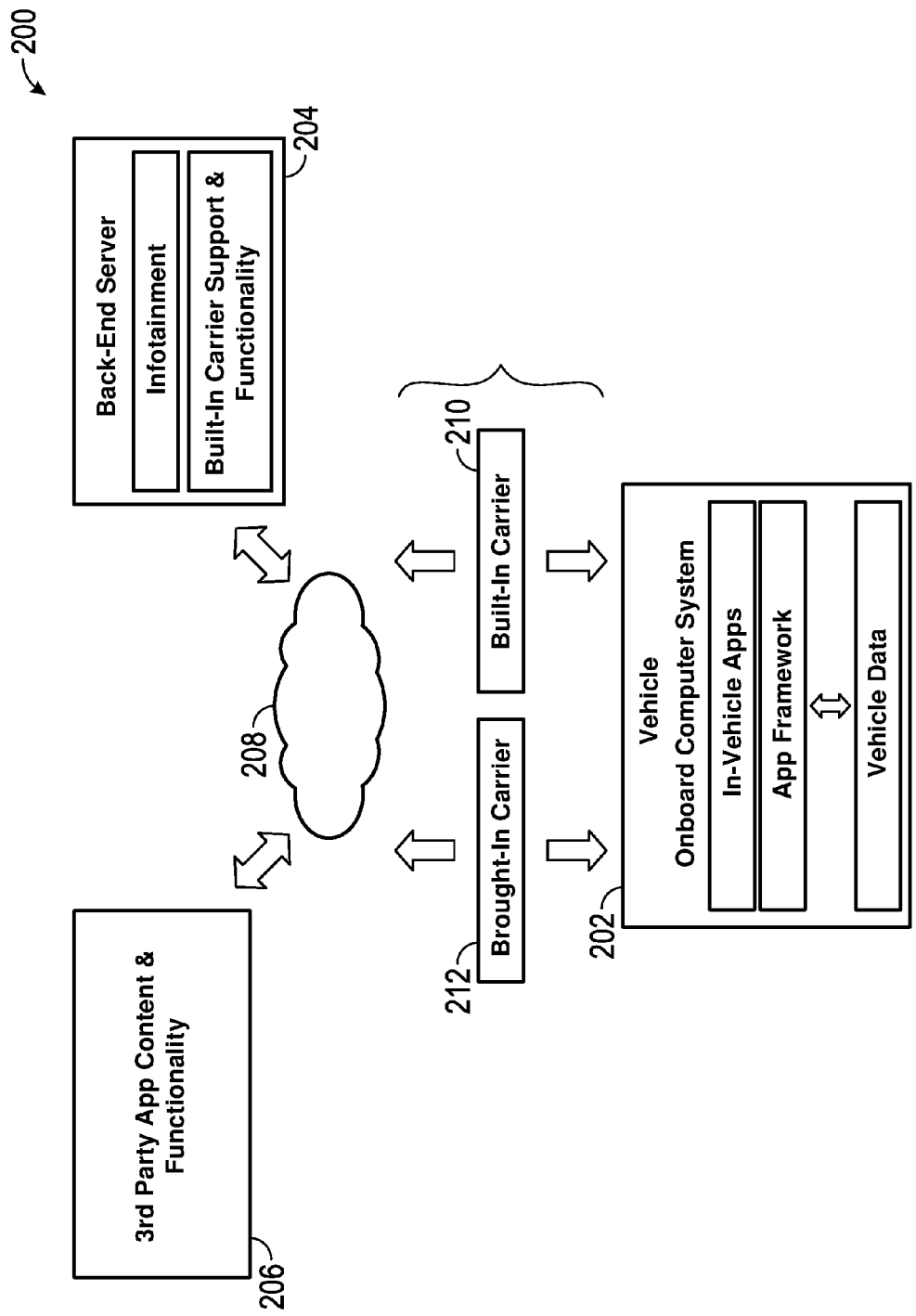
FIG. 2 is a functional block diagram of a software application download environment, in accordance with an embodiment.

FIG. 2 is a functional block diagram of a software application download environment 200, in accordance with an embodiment. As shown, a vehicle onboard computer system 202 has "infotainment" capabilities, including in-vehicle, downloadable software applications (i.e., "apps"), and a framework from which to utilize the apps. Also shown, vehicle data is accessed and used by the apps to accomplish a task for which the app is designed.

The vehicle onboard computer system 202 may receive data communications from a commonly-owned back-end server 204, or from a third party 206 providing material that is compatible for use within the onboard computer system 202. A back-end server 204 may store and provide information related to various aspects of an infotainment system, including but not limited to: a downloadable software application (i.e., "app") ecosystem, various elements related to in-vehicle app framework, and software updates, revisions, and/or additions designed for the vehicle onboard computer system 202 which may include infotainment capabilities. A third party 206 may provide additional downloadable software apps, additional downloadable software features related to the in-vehicle app framework, updates to existing third party 206 provided apps, and the like.

A back-end server 204 or third party 206 transmits data to a vehicle onboard computer system 202 over a data communication network 208, similar to data communication network 108 shown in FIG. 1 (which will not be redundantly described here). For purposes of receiving data transmitted from a back-end server 204, the vehicle onboard computer system 202 utilizes a built-in carrier 210. A built-in carrier may include or cooperate with an onboard vehicle communication or telematics system, such as an OnStar® module commercially marketed and sold by the OnStar® corporation, which is a subsidiary of the assignee of the instant Application, the General Motors Company, currently headquartered in Detroit, Mich. In embodiments wherein the built-in carrier 210 is an OnStar® module, an internal transceiver may be capable of providing bi-directional mobile phone voice and data communication, implemented as Code Division Multiple Access (CDMA). In some embodiments, other 3G technologies may be used to implement the built-in carrier 210, including without limitation: Universal Mobile Telecommunications System (UMTS) wideband CDMA (W-CDMA), Enhanced Data Rates for GSM Evolution (EDGE), Evolved EDGE, High Speed Packet Access (HSPA), CDMA2000, and the like. In some embodiments, 4G technologies may be used to implement the notification module, alone or in combination with 3G technologies, including without limitation: Evolved High Speed Packet Access (HSPA+), Long Term Evolution (LTE) and/or Long Term Evolution-Advanced (LTE-A).

Further, in embodiments where the vehicle onboard computer system 202 uses an OnStar® module as a built-in carrier 210, the OnStar® module provides connectivity to the back-end server 204 via the data communication network 208. Using the OnStar® module, the vehicle onboard computer system 202 has the ability to download software applications and other applicable Infotainment features, along with maintaining the support, functionality, and features that accompany a standard OnStar® module.

For purposes of receiving data transmitted by a third party 206, the vehicle onboard computer system 202 utilizes a brought-in carrier 212, such as a consumer electronics device (e.g., a portable wireless communication device, such as a tablet computer or smartphone). A smartphone refers to a mobile telephone built on a mobile operating system with more advanced computing capability and connectivity than a feature phone. In addition to digital voice service, a modern smartphone includes many of the capabilities of a tablet computer, including the execution of downloadable software applications and connecting to the Internet, and can provide a user with access to a variety of additional applications and services.

Figure 3:
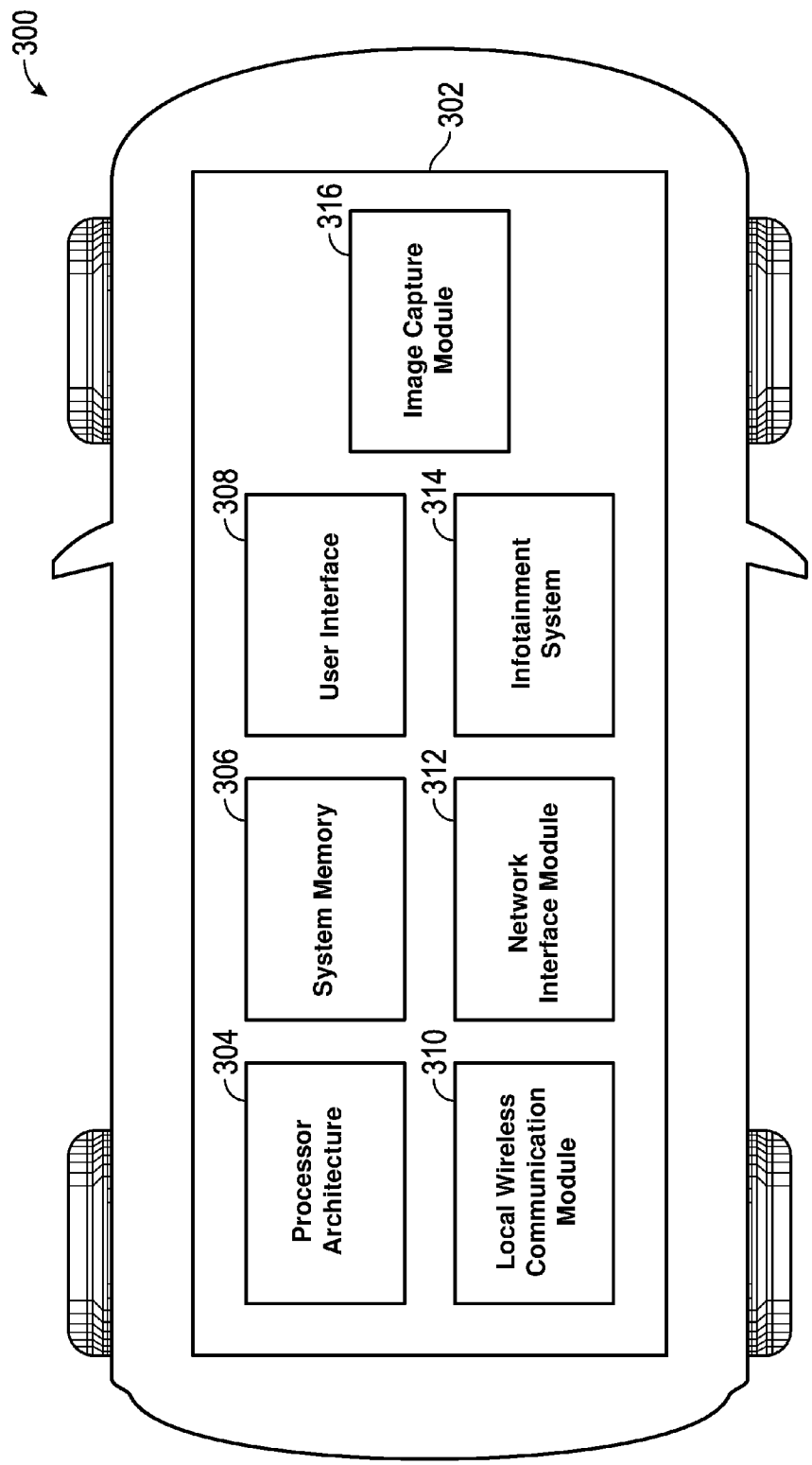
FIG. 3 is a functional block diagram of a vehicle that includes an onboard computer system, in accordance with an embodiment.

FIG. 3 is a functional block diagram of a vehicle 300 that includes a vehicle onboard computer system 302, in accordance with an embodiment. As described with regard to FIG. 1, the vehicle 300 may be any one of a number of different types, which will not be redundantly described here. As depicted, the onboard computer system 302 includes, without limitation, a processor architecture 304, a system memory 306, a user interface 308, a local wireless communication module 310, a network interface module 312, an infotainment system 314, and an image capture module 316.

The processor architecture 304 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 304 may be realized as one or more microprocessors, controllers, microcontrollers, or state machines. Moreover, the processor architecture 304 may be implemented as a combination of computing devices, e.g., a combination of digital signal processors and microprocessors, a plurality of microprocessors, one or more microprocessors in conjunction with a digital signal processor core, or any other such configuration.

The system memory 306 may be realized using any number of devices, components, or modules, as appropriate to the embodiment. Moreover, the onboard computer system 302 could include system memory 306 integrated therein and/or system memory 306 operatively coupled thereto, as appropriate to the particular embodiment. In practice, the system memory 306 could be realized as RAM memory, flash memory, EPROM memory, EEPROM memory, registers, a hard disk, a removable disk, or any other form of storage medium known in the art. In certain embodiments, the system memory 306 includes a hard disk, which may also be used to support functions of the onboard computer system 302. The system memory 306 can be coupled to the processor architecture 304 such that the processor architecture 304 can read information from, and write information to, the system memory 306. In the alternative, the system memory 306 may be integral to the processor architecture 304. As an example, the processor architecture 304 and the system memory 306 may reside in a suitably designed application-specific integrated circuit (ASIC).

The user interface 308 may include or cooperate with various features to allow a user to interact with the onboard computer system 302. Accordingly, the user interface 308 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the onboard computer system 302. For example, the user interface 308 could be manipulated by an operator to select an image capture software application, and configure operational parameters for a plurality of onboard cameras via the image capture software application, as described above.

The local wireless communication module 310 is suitably configured to provide a local wireless network for the transmission of signals between one or more devices within a wireless range of the onboard computer system 302. For example, the local wireless communication module 310 generates a local wireless communication network that is used to communicate data between an infotainment system 314 and an image capture module 316. In some embodiments, the local wireless communication module 310 generates a WLAN network that is compatible with an IEEE 802.11 standard, and in other embodiments, the local wireless communication module 310 may generate an ad-hoc network, a Bluetooth network, a personal area network (PAN), or the like.

The network interface module 312 is suitably configured to communicate data between the onboard computer system 302 and one or more remote servers (see, for example, FIG. 1). As described in more detail below, data received by the network interface module 312 may include, without limitation: downloadable software applications, GPS location data, music, and other data compatible with the onboard computer system 302 and for use with the infotainment system 314. Data provided by the network interface module 312 may include, without limitation: requests to download software applications, image data (including still-frame pictures and/or video) for upload, and the like.

Generally, the network interface module 312 communicates using different protocols than that of the local wireless communication module 310. In this regard, the communication network utilized by the network interface module 312 may be physically and/or logically distinct from the network utilized by the local wireless communication module 310 to establish the communication between devices onboard a vehicle 300. For example, the local wireless communication module 310 creates a first network that may be realized as an ad-hoc network, a Bluetooth network, a PAN, or a WLAN or the like, while the network interface module 312 utilizes a network that is realized as the Internet, a cellular network, a broadband network, a wide area network, or the like.

The onboard computer system 302 of the vehicle 300 includes the functionality of an in-vehicle, interactive, information/media system, otherwise known as an infotainment system 314. Functionality of the infotainment system 314 may be performed by one or more of the included and described parts/modules of the onboard computer system 302, or may be performed by additional parts/modules that are not described in the context of this application.

The infotainment system 314 provides passengers in the vehicle 300 with information and/or entertainment in various forms including, for example, music, news, reports, navigation, weather, sports, music, and notifications about vehicle location and nearby traffic. Infotainment can be delivered in any of a wide variety of forms, including utilizing radio systems, Internet radio, podcast, compact disc, digital video disc, other portable storage devices, video on demand, and the like. The infotainment system 314 also manages software applications related to various functions within the onboard computer system 302, and has the capability to download additional software applications from an application ecosystem. As shown in FIG. 1, the application ecosystem resides on a remote server, and the infotainment system 314 of the onboard computer system 302 communicates with the remote server to select and download software applications, at the discretion of a user. The infotainment system 314 provides a central location for all downloaded software applications, in addition to any built-in software applications and/or functionality of the onboard computer system 302.

The image capture module 316 includes one or more cameras in communication with the various elements of the onboard computer system 302, and has the capability of communicating with the local wireless communication module 310 via a local wireless communication network. Generally, the cameras are chosen and purchased by a user, and integrated into the image capture module 316 by the user. However, cameras may be built-in to the system and/or provided by a vehicle manufacturer, vehicle onboard computer system manufacturer, or the like. Any camera configured to communicate using the same wireless standard as that used by the local wireless communication module 310 may be selected and integrated into the image capture module 316 by a user. For example, a user may select an aftermarket camera that is configured to communicate over a Wi-Fi (i.e., an IEEE 802.11 WLAN) network, and integrate this camera into the image capture module 316 of the onboard computer system 302 of a vehicle 300. If the local wireless communication module 310 is configurable to utilize a compatible Wi-Fi network for communication amongst devices on the vehicle, then the user-selected aftermarket Wi-Fi camera is compatible for use with the local wireless communication module 310.

The placement of the cameras of the image capture module 316 is determined according to user preference, and each camera may be placed anywhere within wireless range of the local wireless communication module 310. Any number of cameras may be placed within wireless range and positioned as chosen by a user, up to the maximum number of cameras that can be accommodated using the existing hardware of the onboard computer system 302. Placement may include an exterior surface of the vehicle 300; an interior surface of the vehicle 300; a location on a driveway, mailbox, or other exterior location; or the like. In some embodiments, a camera could be placed on an interior surface to provide images of occupants inside the vehicle. In some embodiments, a camera could be placed on an exterior surface to provide rear-view driving image data, and in some embodiments, a camera could be placed on an exterior surface to provide front-view driving image data. In certain embodiments, a user could remove a camera from an exterior surface of a vehicle 300, walk several feet but stay within wireless range, capture image data, and then return the camera to the exterior surface of the vehicle. In this example, the camera is still operational within the image capture module of the onboard computer system 302, and still possesses all relevant functionality.

Each camera associated with the image capture module 316 may have the ability to capture still frames and/or video images. Once images are obtained by a camera, the images may be displayed, stored, and/or uploaded, according to user preference. When a user elects to display images from the image capture module 316, they are displayed on an in-vehicle console display, such as a user interface 308 of the infotainment system 314. The user may elect to view images that have been captured and stored, or to view a live video feed from one or more cameras of the image capture module 316. In some embodiments, the user elects to view a live feed of all cameras at once, using a split-screen option on the display. In other embodiments, the user elects to view a live feed from just one camera at a time, and if more than one camera is selected for viewing, the user may elect to cycle through all applicable cameras, viewing each feed for a user-specified period of time before cycling through to the next camera feed in sequence.

When a user elects to store images from the image capture module 316, the images may be stored within system memory 306 or stored using removable media, such as a USB drive. The preferred location for image storage is a user-configurable parameter within the software application of the infotainment system 314.

When a user elects to upload images from the image capture module 316, the images may be uploaded using network access of the onboard computer system 302 of the vehicle 300. Images may be uploaded to an internet website, such as a social media website or an image viewing/sharing website, using the network interface module 312. Also using the network interface module 312, images may be uploaded to internet-accessible, cloud-based storage services. In addition, images may be uploaded to a computer using a home or office network, for example, when the vehicle 300 is located within wireless range of the network and has been granted access, using the local wireless communication module 310. A user may configure the upload to occur at automatic, user-specified time intervals, or the user may configure uploads to occur only when manually commanded via the user interface 308.

In addition to image data, the image capture module 316 may also communicate other data recognized by the camera hardware, such as a camera status, remaining battery life, and the like. Other data transmitted by the image capture module is determined by the capabilities of the particular model of camera used. In some embodiments, this data may be displayed on the user interface 308 of the onboard computer system 302 to inform the user.

Operational parameters for the image capture module 316 may be configured by a user via the infotainment system 314. In certain embodiments, a user may access a downloadable software application within the infotainment system 314 in order to configure and use the image capture module 316. Operational parameters of the image capture module 316 may include, without limitation: designating a particular camera to operate according to specified instructions, designating the capture of a specified number of images, designating the capture of either a still frame image or a video clip of a specified time duration, or the like.

Additionally, operational parameters may be configured automatically through the use of pre-programmed macros, or in other words, sections of executable code containing instructions to configure the operation of one or more cameras operating in an image capture module. A user may set up a plurality of macros, and select one for use, depending on current circumstances. For example, a user may program Macro 1 to configure an image capture module to capture still-frame images from a side-facing camera every twenty minutes during a drive across the country. In another example, a user may program Macro 2 to instruct an image capture module to capture 5 minute videos, beginning every hour, from a front-facing camera during a different long trip.

In certain embodiments, the image capture module 316 operates in one of three modes: full automatic (FA) mode, variable automatic (VA) mode, or manual (M) mode. The mode is chosen by the user via a user interface 308. To utilize any of the three modes, an image capture software application must have been executed on the vehicle onboard computer system 302.

When operating in FA mode, a software application launches and the image capture module 316 searches for all usable devices (e.g., wireless communication enabled cameras) when the vehicle 300 is started. When operating in VA mode, the software application launches and the image capture module 316 searches for all usable devices if a particular parameter is met. The particular parameter may include any behavior or task completion performed by the vehicle 300 that a user has configured via the user interface 308 (e.g., the vehicle 300 is backing up, the vehicle 300 doors are open, ignition keys are in AUX mode, etc.). When operating in M mode, the software application does not launch, and the image capture module 316 does not search for usable devices, unless prompted by a user via the user interface 308.

Figure 4:
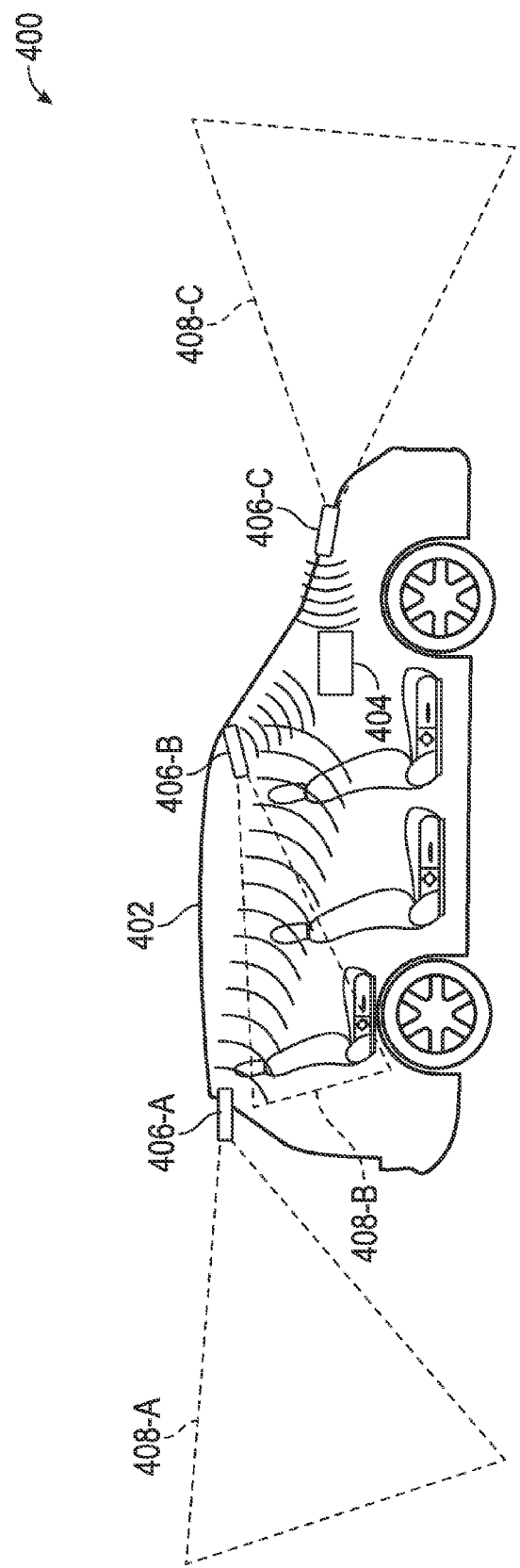
FIG. 4 is a system diagram of a vehicle image capture system, in accordance with an embodiment.

FIG. 4 is a diagram of a typical vehicle image capture system 400, including cameras (406-A, 406-B, 406-C) positioned on a vehicle 402. As shown, the cameras (406-A, 406-B, 406-C) communicate wirelessly with an onboard computer system 404, which provides a display for received image data and provides a user interface for configuring operational parameters of the cameras (406-A, 406-B, 406-C). As shown, camera 406-A is positioned on the back of the vehicle 402 to provide image coverage area 408-A. Camera 406-B is positioned on the interior of the vehicle 402 to provide a view of the occupants of the back seat, which is shown to be image coverage area 408-B. Camera 406-C is positioned on the front of the vehicle 402 to provide a view of the area in front of the vehicle 402, which is image coverage area 408-C.

Using the cameras (406-A, 406-B, 406-C), a user may view the image coverage areas (408-A, 408-B, 408-C) as an individual live feed cycling through all three cameras on a time interval, as a group live feed using a split-screen display, or the user may view captured and stored still-frame images and/or video of the area. Further, a user may capture and store or upload image data from any combination of the cameras (406-A, 406-B, 406-C), at user-specified time intervals or upon user command.

Figure 5:
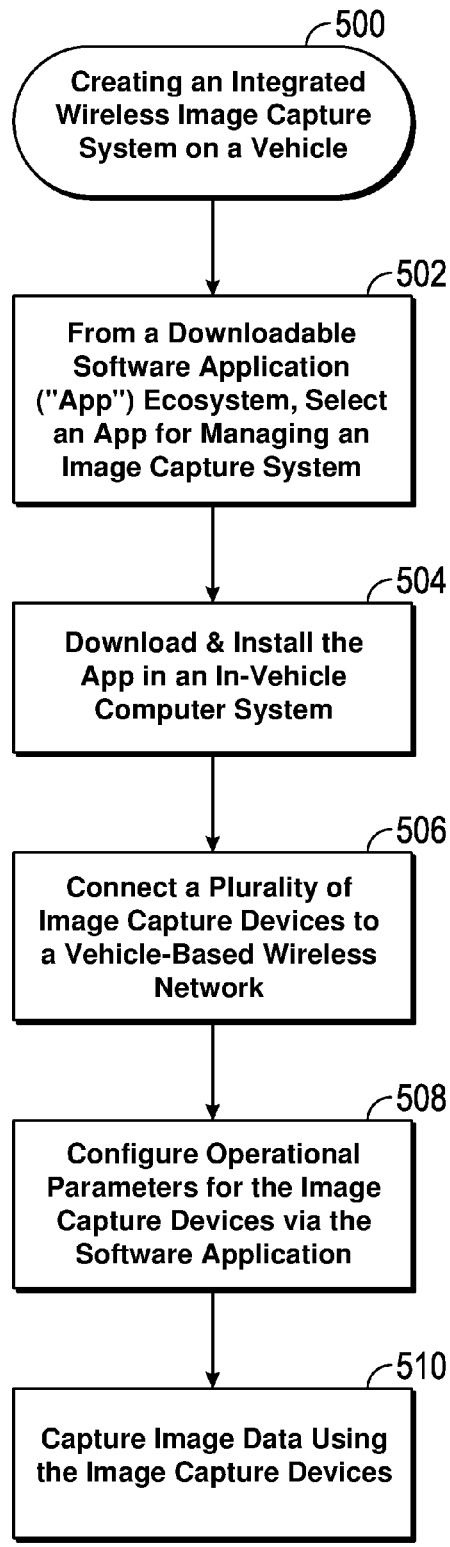
FIG. 5 is a flowchart that illustrates an embodiment of a process for creating an integrated wireless image capture system on a vehicle.

FIG. 5 is a flowchart that illustrates an embodiment a process 500 of creating an integrated wireless image capture system on a vehicle. For ease of description and clarity, this example assumes that the process 500 begins with the selection of a downloadable software application ("app") for managing a vehicle-based image capture system (step 502). In certain embodiments, the app may be selected from a software application ecosystem, which includes a plurality of downloadable software applications. Generally, the app includes drivers, control software, etc. that provide functionality for a vehicle-based image capture system. The app may include one or more of the following features, without limitation: a graphical user interface (GUI), a list of all stored pictures, a list of all stored videos, a photo preview feature, selections for configuring operational parameters including action triggers for individual and/or collective groups of image capture devices, and the like. Once the app has been selected, the process 500 causes an onboard vehicle computer system to download and install the app (step 504) for use.

After the image capture app has been downloaded and installed (step 504), the process 500 includes the connection of a plurality of image capture devices to a vehicle-based wireless network (step 506). The plurality of image capture devices may include devices produced and/or sold by the vehicle manufacturer (or a subsidiary), "aftermarket" devices produced by a party other than the vehicle manufacturer or a subsidiary, or any combination of these. A user selects any image capture devices according to his/her preferences, brings them within wireless range of the vehicle, and connects them to the vehicle-based wireless network. In certain embodiments, image capture devices are positioned, and fastened securely, on interior and/or exterior surfaces of a vehicle. In some embodiments, image capture devices are positioned within wireless range of the vehicle, but are not positioned on or in the vehicle itself. For example, a user may place a camera in his driveway to provide image data of an area that is difficult for a driver to see when backing out or an area that has a high likelihood of hazards. The image capture devices (i.e., cameras) have the capabilities of connecting to, and transmitting signals using, a wireless network, and the in-vehicle wireless network is configured to accept connecting peripheral devices. In certain embodiments, a user utilizes the downloaded software app within a vehicle onboard computer system to access data regarding image capture devices currently connected to the vehicle-based wireless network.

Next, the process 500 initiates the configuration of operational parameters for the newly-connected image capture devices via the onboard computer system (step 508). A user interacts with an in-vehicle, onboard computer system to select options and type in settings related to the use and operation of the connected image capture devices. After the operational parameters for the image capture devices have been configured (step 508), the process 500 captures image data using the image capture device (step 510), as directed by the configured operational parameters.

Figure 6:
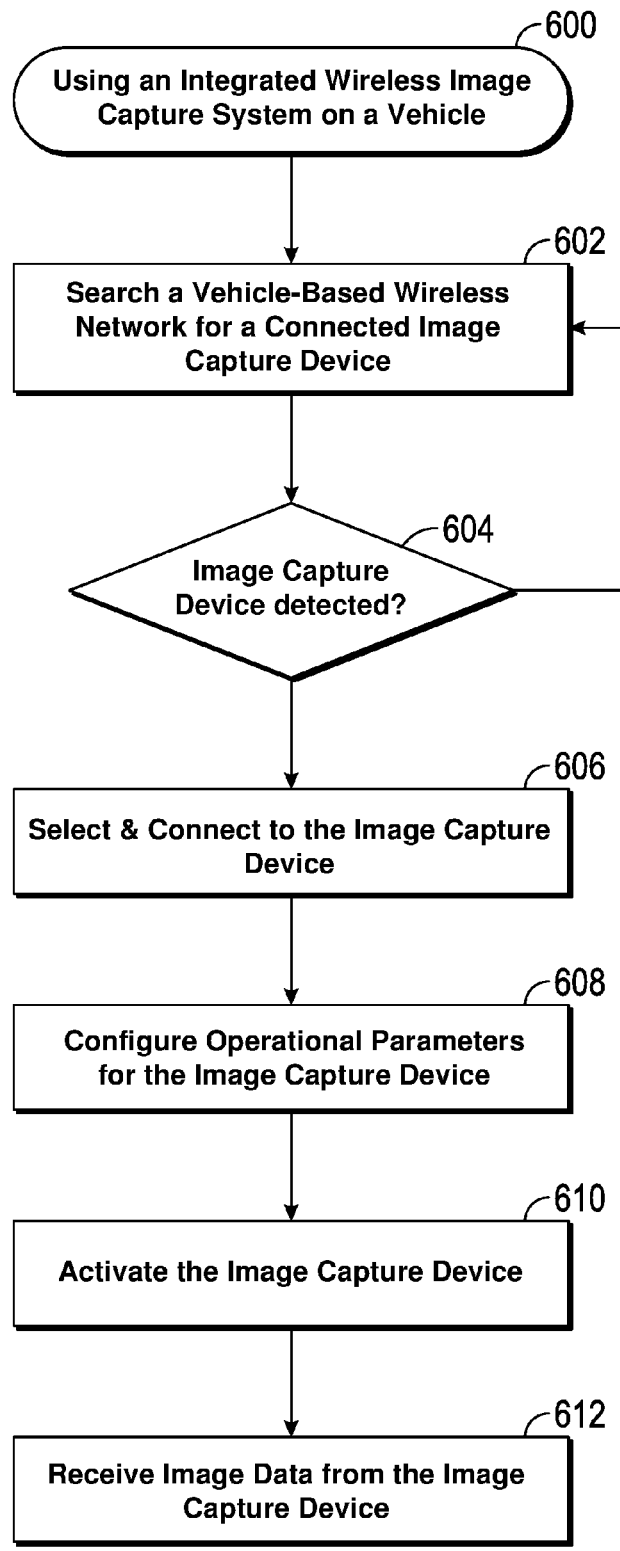
FIG. 6 is a flowchart that illustrates an embodiment of a process of using an integrated wireless image capture system on a vehicle, according to one embodiment.

FIG. 6 is a flowchart that illustrates an embodiment a process 600 of using an integrated wireless image capture system on a vehicle, according to one embodiment. The various tasks performed in connection with process 600 described here may be performed by software, hardware, firmware, or any combination thereof. For illustrative purposes, the description of process 600 may refer to elements mentioned above in connection with FIG. 1 through FIG. 4. In practice, portions of a described process may be performed by different elements of the described system, e.g., the system firmware, logic within a vehicle onboard computer system, or other logic in the system. It should be appreciated that a described process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted from embodiments of a described process as long as the intended overall functionality remains intact.

For ease of description and clarity, this example assumes that the process 600 begins by searching a vehicle-based wireless network for any connected image capture devices (step 602). As described previously with regard to FIG. 3, searching for, and the detection of, image capture devices may occur according to a user-configured mode of operation (e.g., full automatic, variable automatic, or manual), according to some embodiments.

If an image capture device is not detected (the "No" branch of 604), the process 600 continues searching the wireless network (step 602). A vehicle onboard computer system has the capability to detect wireless peripheral devices connected to its own, vehicle-based wireless network. In some embodiments, a wireless peripheral device, such as a camera with the capability of communicating data wirelessly, connects to the vehicle-based wireless network, causing a notification to appear on a user interface of the vehicle onboard computer system. In this example, when the notification appears, the user is informed that a device has been detected.

When an image capture device is detected (the "Yes" branch of 604), the process 600 causes an onboard computer system to select and connect to the detected image capture device (step 606). In certain embodiments, when a notification appears on a user interface to inform a user that an image capture device has been detected, the user is then prompted to accept or reject a connection to the image capture device. In other embodiments, the onboard computer system may connect automatically to a detected image capture device. In some embodiments, an image capture software application launches when the image capture device is detected and a connection is established.

Once the onboard computer system is connected to the detected image capture device (step 606), the process 600 initiates the configuration of operational parameters for the image capture device (step 608). Generally, the process 600 utilizes user-entered configuration data or preference settings to instruct each image capture device to function according to operational parameters. Operational parameters may include, without limitation: instructions to capture still-frame or video image data, a number of images, a time duration for video capture, instructions to capture still-frame or video image data continuously at user-specified time-intervals, and the like. In certain embodiments, the operational parameters may include action triggers, such as a specific vehicle operation, which initiates performance of the image capture devices according to user-specified preferences. Action triggers may include, without limitation: accelerating quickly, braking hard, exceeding a safe driving speed, turning quickly, and/or other high-risk behaviors. In addition, action triggers may include user-specified throttle positions, steering angle, braking behavior, airbag deployment, and the like. Action triggers may include any data that a vehicle onboard computer system is able to access; a user may configure acceptable threshold levels for any measurable or quantifiable vehicle data accessible by the onboard computer system, wherein exceeding the threshold triggers performance of the connected image capture devices.

In embodiments where an automatic connection is created without user input, the process 600 may use default and/or pre-programmed operational parameters so that the automatically connected image capture device may begin operation immediately upon connection to the vehicle-based wireless network.

After configuring operational parameters for the image capture device (step 608), the process 600 activates the image capture device (step 610), so that the image capture device will operate using the configured operational parameters. In some embodiments, a user may click a button or make some kind of on-screen selection to begin image capture according to user-configured operational parameters. In other embodiments, when an automatic connection has been created and default or pre-programmed operations parameters are being used, the system may automatically begin image capture. In this example, a user may override the automatic connection or image capture via a user interface on the vehicle onboard computer system.

Next, the process 600 receives image data from the image capture device (step 612). The image data may be in the form of a live feed or image data (including still-frame and/or video) to be displayed, stored, and/or uploaded. Image data may be handled according to pre-programmed user preferences, immediate user command, or default functionality.

Towing Applications

Figure 7:
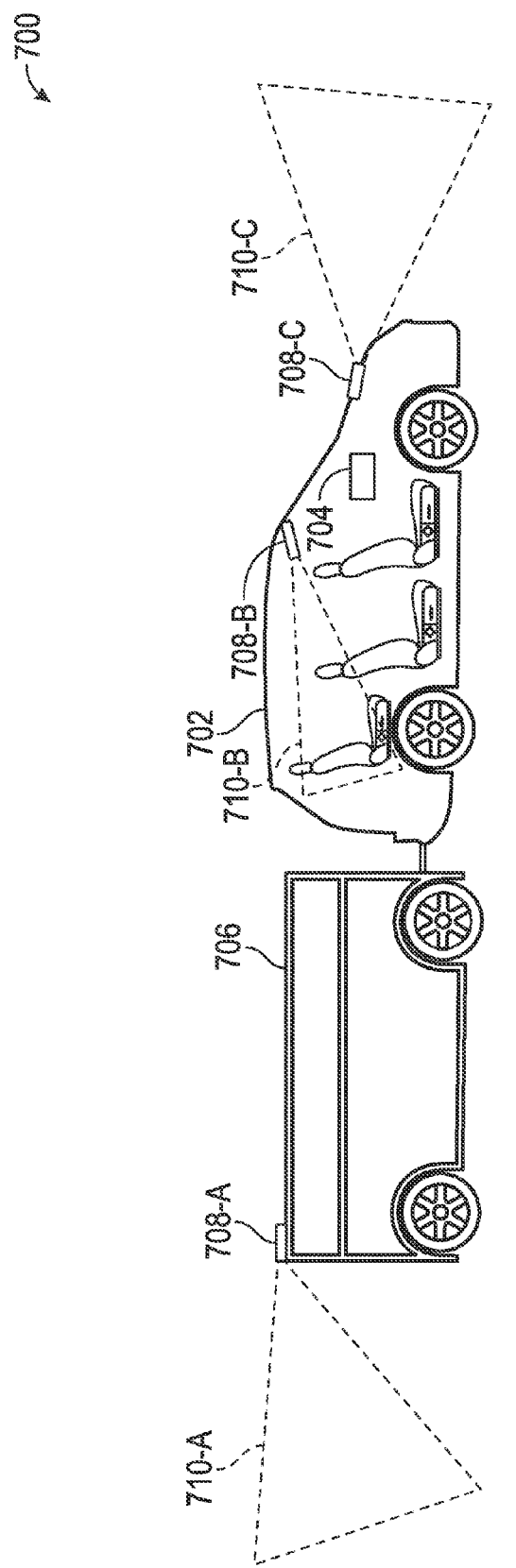
FIG. 7 is a system diagram of a vehicle image capture system, as applied to a vehicle towing application, in accordance with an embodiment.

FIG. 7 is a diagram of a vehicle image capture system 700, as applied to a vehicle 702 and an attached tow object 706, according to some embodiments. As shown, a camera 708-A is positioned on the tow object 706, and two cameras 708-B, 708-C are positioned on a vehicle 702 that is towing the tow object 706. As described previously with regard to FIG. 4, cameras (708-A, 708-B, 708-C) communicate wirelessly with an onboard computer system 704, which provides a display for received image data and provides a user interface for configuring operational parameters of the cameras (708-A, 708-B, 708-C). Using cameras (708-A, 708-B, 708-C), a user may view the image coverage areas (710-A, 710-B, 710-C) as an individual live feed cycling through all three cameras on a time interval, as a group live feed using a split-screen display, or the user may view captured and stored still-frame images and/or video of the area. Further, a user may capture and store or upload image data from any combination of the cameras (708-A, 708-B, 708-C), at user-specified time intervals or upon user command. Many of the features, components, and functionality of the system 700 are similar (if not identical) to those described above with reference to FIGS. 1-6. For the sake of brevity and clarity, shared or common features, components, and functionality will not be redundantly described here in the context of the system 700.

The tow object 706 can be mechanically coupled to the vehicle 702 in accordance with very well-known towing mechanisms and components. "Tow objects" may include flatbed or open trailers, enclosed trailers, boat trailers, recreational vehicle trailers, tank trailers, container trailers, and the like. It is also appreciated by those of ordinary skill in the art that a tow object is not necessarily limited to a trailer and its accompanying cargo; a tow object may also comprise any object having wheels and the ability to connect to a tow hitch for purposes of being towed, such as automobiles, tractors, go-karts, all-terrain vehicles (ATVs), and the like. The coupling and/or connection may consist of a chain, rope, bar, integrated platform, or some other means of keeping the vehicle 702 connected to the tow object 706 while in motion.

Camera 708-A may be positioned to face and capture image data in any direction, and may capture image data around the tow object 706. In a typical installation, the camera 708-A is oriented to cover a field of view that is primarily behind the tow object 706. Image capture devices used in towing applications may be particularly useful for viewing the road area directly behind a tow object, giving the driver of the vehicle 702 a visual estimate of the distance from the back of the tow object to any other vehicles traveling behind it. In addition, image capture devices may be positioned to view the connection/coupling between the vehicle 702 and the tow object 706, so that the driver of the vehicle 702 may monitor the connection as needed. Alternatively, image capture devices may be positioned to view either or both sides of the tow object 706, to eliminate blind spots for the driver of the vehicle 702.

A wireless image capture device, such as camera 708-A, is an improvement over a wired version, which would require the routing of wires from the tow object 706 to a connector on the vehicle 702. Although the connection of brake light wires and turn signal wires is still required when coupling a tow object 706 to a vehicle 702, eliminating the need for additional wiring for one or more image capture devices is more convenient and less cluttered. Further, a wireless image capture device in communication with the vehicle onboard computer system 704 is convenient to configure and operate from inside the vehicle 702 without requiring hardware in addition to the image capture device itself.

Figure 8:
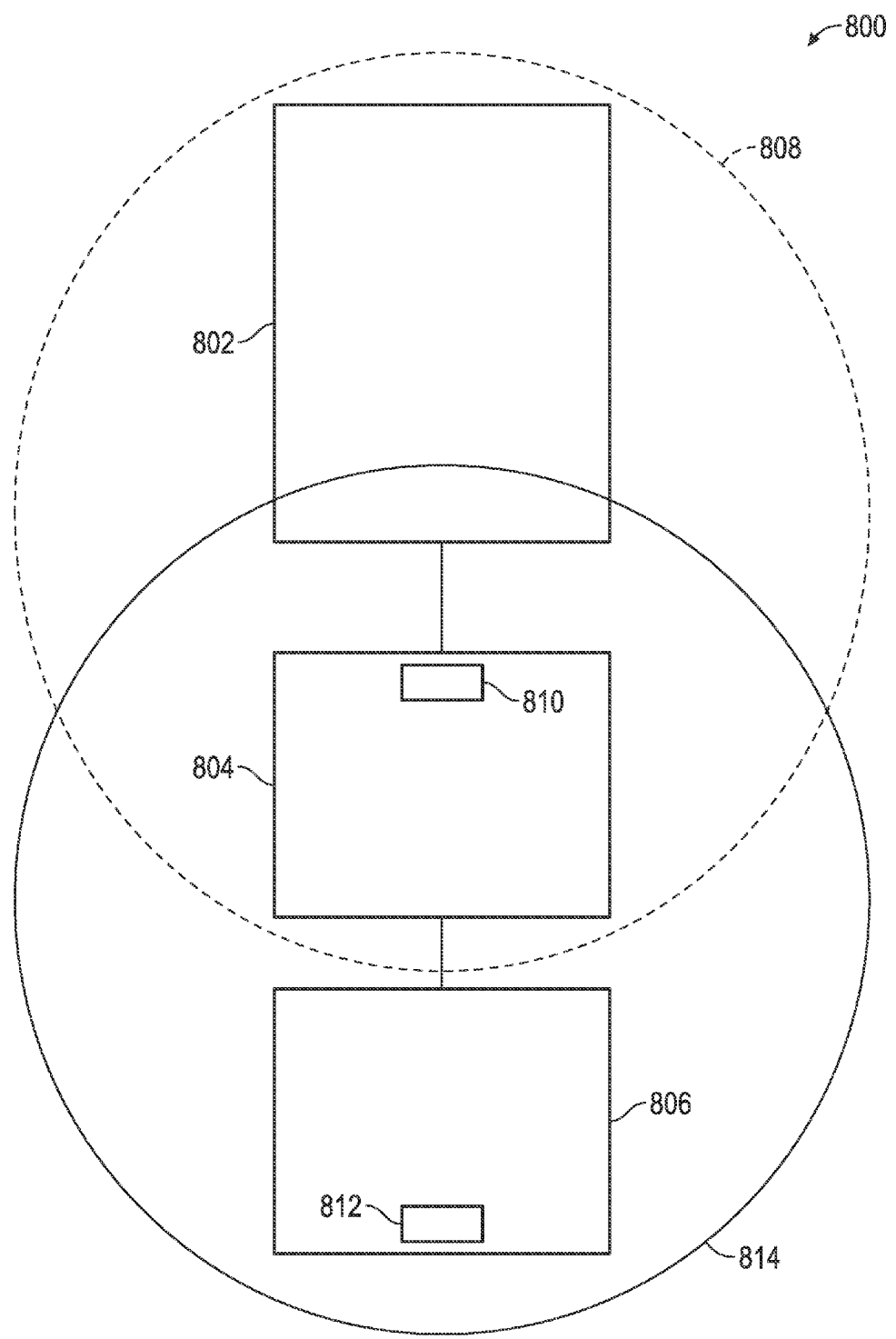
FIG. 8 is a system diagram of a vehicle image capture system, as applied to another vehicle towing application, in accordance with an embodiment.

The vehicle 702 may tow more than one tow object 706. In this regard, FIG. 8 depicts an alternative system arrangement that includes a vehicle 802, a first tow object 804 that is immediately behind the vehicle 802, and a second tow object 806 that is immediately behind the first tow object 804. As shown in FIG. 8, (and described above with relation to FIGS. 1 and 4), wireless cameras 810, 812 may be placed anywhere within a generated wireless range 808 of the vehicle 802, which may include positioning/placement on the vehicle 802 itself, on the first tow object 804, on the second tow object 806, etc. Generally, as long as a camera or image capture device is positioned within wireless range 808 of the vehicle 802, it will have the capability of communicating data, including image capture data, with an onboard computer system of the vehicle 802.

In certain embodiments, image capture devices, such as camera 812 may also be placed outside of the nominal wireless range 808 of the vehicle 802, while still transmitting data to the onboard computer system 704 via other image capture devices (such as camera 810) located within wireless range 808 of the vehicle 802. In certain embodiments, a second camera 812 is placed outside of the wireless range 808 of the vehicle 802, but within a wireless range 814 of a first camera 810. The second camera 812 captures image data and transmits the image data (along with any other relevant camera data) to the first camera 810. The first camera 810, which is located within wireless range 808 of the vehicle, is then able to transmit data relating to itself and data relating to second camera 812 to the onboard computer system of the vehicle 802. In this way, the first camera 810 functions as a "wireless repeater", extending the wireless communication range from which the vehicle 802 may obtain camera data and allowing for additional and/or larger tow objects 804, 806 to utilize wireless image capture devices as part of a vehicle image capture system.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for using an integrated wireless image capture system on a vehicle and a tow object, the method comprising:
   connecting, by a computer system onboard the vehicle, to a first image capture device positioned within a first wireless range of the vehicle and over a vehicle-based wireless network;
   transmitting a first set of commands to the first image capture device, via the first wireless range, for the first image capture device to:
      configure operational parameters for the first image capture device;
      obtain first image data; and
      transmit the first image data to the computer system;
   transmitting a second set of commands to the first image capture device, via the first wireless range, for the first image capture device to:
      generate a second wireless range;
      communicate with a second image capture device positioned on the tow object, within the second wireless range, and outside of the first wireless range, wherein the tow object is coupled to the vehicle;
      obtain second image data from the second image capture device; and
      operate as a wireless repeater by transmitting the second image data to the computer system onboard the vehicle; and
   receiving, at the computer system onboard the vehicle, the first image data and the second image data from the first image capture device, wherein the first image data and the second image data are captured by the first image capture device and the second image capture device in accordance with the configured operational parameters.

2. The method of claim 1, further comprising:
   detecting the first image capture device within the first wireless range of the vehicle, wherein the connecting step is performed after detecting the first image capture device.

3. The method of claim 1, wherein the connecting step further comprises:
   detecting a set of candidate image capture devices connected to the vehicle-based wireless network; and
   selecting the first image capture device from the set of candidate image capture devices, for connection over the vehicle-based wireless network.

4. The method of claim 1, wherein the connecting step further comprises
   detecting a set of candidate image capture devices connected to the vehicle-based wireless network and positioned on the tow object; and
   selecting the first image capture device from the set of candidate image capture devices, for connection over the vehicle-based wireless network.

5. The method of claim 1, wherein the connecting step further comprises
   detecting a set of candidate image capture devices connected to the vehicle-based wireless network, wherein the set of candidate image captures devices is positioned on an exterior surface of the vehicle and on the tow object; and
   selecting the first image capture device from the set of candidate image capture devices, for connection over the vehicle-based wireless network.

6. The method of claim 1, further comprising:
   detecting an occurrence of an operation performed by the vehicle; and
   in response to detecting the occurrence, operating the first image capture device according to the operational parameters.

7. The method of claim 1, further comprising:
   detecting an occurrence of a pre-defined high-risk operation; and
   in response to detecting the occurrence, operating the first image capture device according to the operational parameters.

8. The method of claim 1, further comprising:
   detecting an occurrence of a vehicle collision; and
   in response to detecting the occurrence, operating the first image capture device according to operational parameters.

9. The method of claim 1, wherein the step of configuring operational parameters for the first image capture device further comprises:
   receiving user input comprising instructions for the first image capture device to capture a user-specified number of images at a plurality of user-specified time intervals; and
   transmitting the instructions to the first image capture device.

10. A wireless communication system for a vehicle and a tow object coupled to the vehicle, comprising:
    a first wireless camera, positioned within a first wireless range of the vehicle, the first wireless camera configured to:
       capture first wireless camera images;
       transmit the first wireless camera images to an automotive head unit (AHU) via the first wireless range; and
       generate a second wireless range;
    a second wireless camera, positioned on the tow object, outside of the first wireless range of the vehicle, and within the second wireless range of the first wireless camera, the second wireless camera configured to:
       capture second wireless camera images; and
       transmit the second wireless camera images to the first wireless camera via the second wireless range;
    wherein the first wireless camera is further configured to function as a wireless repeater by transmitting the second wireless camera images to the AHU via the first wireless range; and
    the AHU onboard the vehicle and communicatively coupled to the first wireless camera, the AHU configured to:
       receive the first wireless camera images and the second wireless camera images from the first wireless camera; and
       display the received first wireless camera images and the second wireless camera images.

11. The wireless communication system of claim 10, wherein the AHU is further configured to host and execute a downloadable software application to process the data from the first wireless camera and the second wireless camera; and
    wherein the downloadable software application is accessible to a user via a user interface of the AHU.

12. The wireless communication system of claim 10, wherein the AHU is further configured to:

receive user commands via a user interface; and configure at least one automatic function of the first wireless camera to occur at a specified time interval, according to the user commands.

13. The wireless communication system of claim 10, wherein the AHU is further configured to upload the first wireless camera images and the second wireless camera images to a website.

14. The wireless communication system of claim 10, wherein the AHU is further configured to store the first wireless camera images and the second wireless camera images within an internal memory.

15. An automobile head unit (AHU) comprising a non-transitory, computer-readable medium containing executable instructions thereon, which, when executed by a processor, are configured to:

receive input at the AHU, via a user interface, the input comprising:
  a first command to activate a first camera positioned within a first wireless range of an automobile, wherein the automobile houses the AHU;
  a second command for the first camera to:
    operate according to one or more specific parameters;
    obtain first camera image data; and
    transmit the first camera image data to the AHU;
  a third command for the first camera to:
    generate a second wireless range;
    communicate with a second camera positioned on a trailer, within the second wireless range, and outside of the first wireless range, wherein the trailer is coupled to the automobile;
    obtain second camera image data from the second camera; and
    operate as a wireless repeater by transmitting the second camera image data to the AHU;
  a fourth command for manipulating the first camera data and the second camera data received by the AHU;

transmit the first, second, and third commands to the first camera via a wireless network operable within the first wireless range;

receive the first camera data and the second camera data transmitted by the first camera, wherein the first camera data and the second camera data are obtained by the first camera operating according to the first, second, and third commands; and manipulate the first camera data and the second camera data according to the fourth command.

16. The non-transitory, computer-readable medium of claim 15, wherein the third command further comprises an instruction to store the first camera data and the second camera data in AHU system memory.

17. The non-transitory, computer-readable medium of claim 15, wherein the third command further comprises an instruction to upload the first camera data and the second camera data to a designated social media website.

18. The non-transitory, computer-readable medium of claim 15, wherein the third command further comprises an instruction to upload the first camera data and the second camera data to a designated social media web site at user-specified time intervals.

19. The non-transitory, computer-readable medium of claim 15, wherein the executable instructions comprise a downloadable application maintained by a remote server system.

20. The non-transitory, computer-readable medium of claim 15, wherein the one or more specific parameters comprise instructions for the first camera and the second camera to record a user-specified duration of video at a plurality of user-specified time intervals.

* * * * *